TEMPERATURE SENSING, INDICATING AND RECORDING MEANS
Filed June 1, 1964 2 Sheets-Sheet 1
FIG. 1
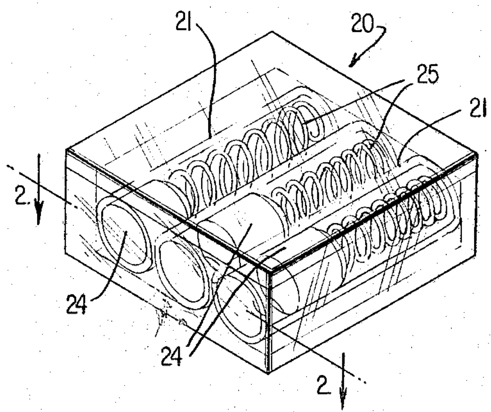
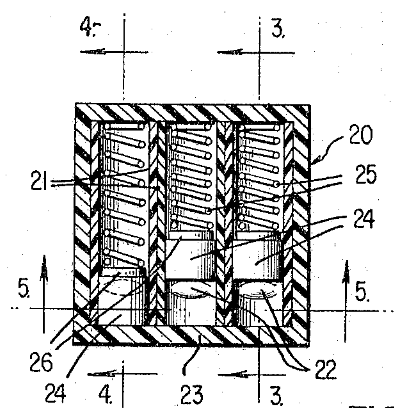
FIG. 2
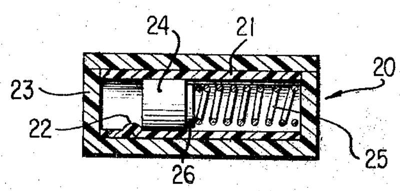
FIG. 3
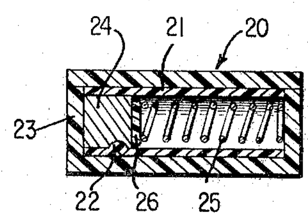
FIG. 4
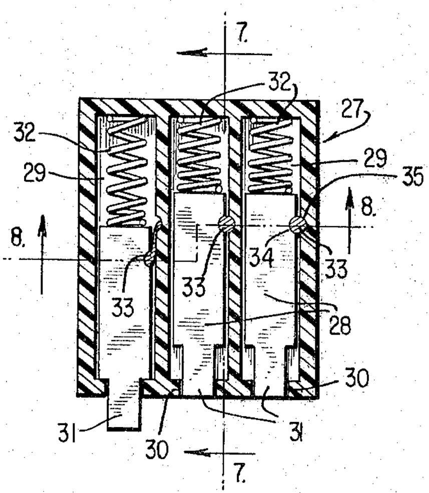
FIG. 6
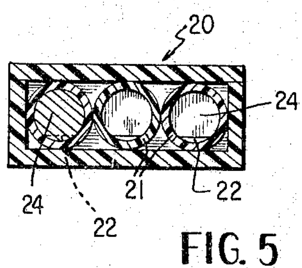
FIG. 5
INVENTORS.
DON L. CARBAUGH
OREN H. HECKATHORNE
BY
B. P. Fishburne, Jr.
ATTORNEY TEMPERATURE SENSING, INDICATING AND RECORDING MEANS
Filed June 1, 1964 2 Sheets-Sheet 2
FIG. 7
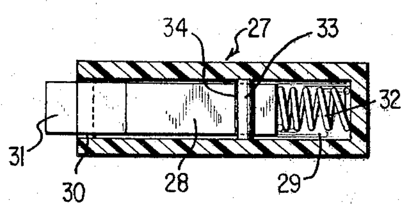
FIG. 8
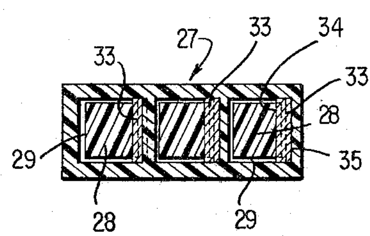
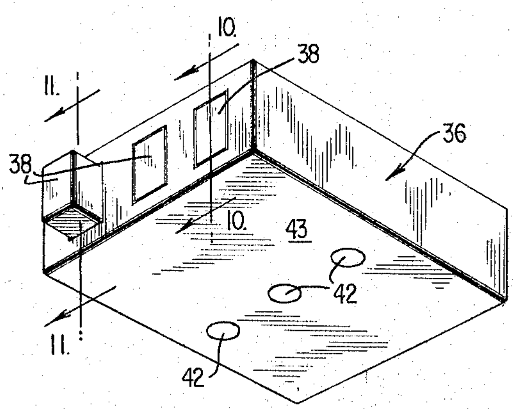
FIG. 9
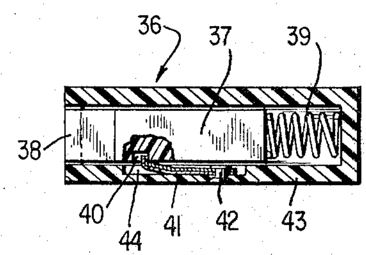
FIG. 10
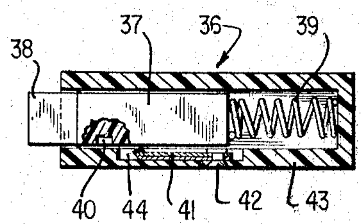
FIG. 11
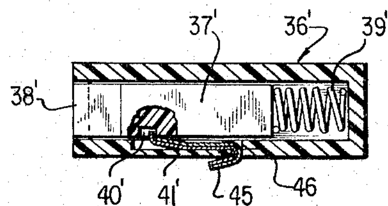
FIG. 12
INVENTORS.
DON L. CARBAUGH
OREN H. HECKATHORNE
BY
B. P. Fishburne, Jr.
ATTORNEY United States Patent Office 3,290,942
Patented Dec. 13, 1966

3,290,942
TEMPERATURE SENSING, INDICATING AND RECORDING MEANS

Don L. Carbaugh, Dutch Ridge Road, and Oren Howard Heckathorne, 1089 3rd St., both of Beaver, Pa.
Filed June 1, 1964, Ser. No. 371,367
4 Claims. (Cl. 73—358)

This invention relates to a temperature sensing, indicating and recording means.

More particularly, the invention is a highly simplified device capable of indicating and providing a record of maximum levels of operating temperatures encountered over a period of time. The device is intended as a monitoring means for attachment to various kinds of mechanical or electrical equipment, wherever maximum limits of operating temperatures are of concern. The function of the invention device differs from and cannot find its equivalent in a thermometer because a thermometer would require constant or continuous reading and would not maintain a maximum temperature reading after certain equipment has cooled down.

The invention device is highly compact and economical in construction, made from readily available materials, substantially foolproof in operaiton and highly reliable.

Particular features of the invention or objectives which have been realized include the following:

(1) Any number of cartridges may be gauged in one assembly.

(2) The device is spring-loaded to achieve a positive action independent of gravity. It therefore operates in any position.

(3) The casing is electrically non-conducting and may therefore be placed in direct contact with energized electrical equipment.

(4) The invention device by slight modification may be inherently non-resettable or readily resettable or reusable after temperature lowers.

(5) In all forms, the invention senses a combination of local ambient air temperature and test surface temperature by virtue of air circulation and heat conduction around and through the box casing. One form of the invention supplements these sensitivities by placing a heat conducting metal element in direct contact with the test surface.

Other objectives and advantages of the invention will be apparent to those skilled in the art during the course of the following detailed description.

In the accompanying drawings forming a part of this application and in which like numerals are employed to designate like parts throughout the same, FIGURE 1 is a perspective view of a temperature indicating device embodying the invention according to one preferred form thereof, FIGURE 2 is a horizontal cross section taken on line 2—2 of FIGURE 1, FIGURE 3 is a longitudinal vertical cross section taken on line 3—3 of FIGURE 2, FIGURE 4 is a similar section taken on line 4—4 of FIGURE 2, FIGURE 5 is a transverse vertical section taken on line 5—5 of FIGURE 2, FIGURE 6 is a cross sectional view similar to FIGURE 2 illustrating a modification of the invention, FIGURE 7 is a vertical section taken on line 7—7 of FIGURE 6, FIGURE 6 is a transverse vertical section taken on line 8—8 of FIGURE 6, FIGURE 9 is a perspective view of a further modification of the invention, FIGURE 10 is a longitudinal vertical section taken on line 10—10 of FIGURE 9, FIGURE 11 is a similar section taken on line 11—11 of FIGURE 9, and FIGURE 11 is a similar section taken on line 11—11 of FIGURE 9, and FIGURE 12 is a view similar to FIGURE 10 showing a slight modification of the FIGURE 10 embodiment.

In the drawings, wherein for the purpose of illustration are shown preferred embodiments of the invention, attention is directed first to FIGURES 1–5 inclusive wherein the numeral 20 designates a shallow rectangular box or casing formed of transparent plastic or glass and produced in any conventional manner. Suitably secured within the casing 20 in parallel substantially contacting relation are a plurality of cylindrical tubes 21 also formed of transparent plastic or glass and immovable relative to the casing 20.

Each tube 21 is provided near one end thereof with an inward projection or detent 22 and all of the detents 22 are spaced equidistantly from the adjacent side wall 23 of the casing 20. Within each tube 21 is a slug 24 or cylindrical mass of material having a precise melting point. Each slug 24 of the indicator assembly is formed of a different material having a different precise melting point so that each slug will melt or soften at a specific desired elevated temperature. Alloys of metals and other compositions are commercially available and well known for producing the slugs 24 having distinct and precise melting points.

For example, in a three element unit or device as depicted in FIGURE 1, one of the slugs 24 may be chosen to melt at 120° F. while the second slug is chosen to melt at 160° F. and the third slug at 200° F. approximately. Obviously, these temperatures may be varied widely by choossing the proper materials for the slugs 24. Also, the indicator device may contain any desired number of slugs or cartridges found practical. Preferably, the invention in all disclosed forms thereof is composed of plural indicator components so that a range of operating temperatures for machinery and the like can be sensed, indicated and recorded after cooling. That is to say, in the embodiment of the invention shown in FIGURE 1, the plural indicator elements will be capable of indicating and recording the fact that a given piece of machinery or equipment has or has not exceeded or been exposed to temperatures above one, two or three critical temperatures. This will be explained hereinafter.

Each cylindrical slug 24 is backed up in its tube 21 by a compressible coil spring 25 and an intervening flat disc 26 of plastic or the like. The disc 26 prevents the spring from migrating into the slug 24 appreciably when the slug softens due to a rise in temperature. Considering the invention unit of FIGURES 1–5, the several springs 25 are all of equal strength and each indicator unit of the assembly differs from the other units only in that the three slugs 24 have specifically different precise melting points.

Prior to melting of any of the slugs 24, the detents 22 resist the action of the springs 25 and maintain the indicator slugs in the retracted condition shown particularly in FIGURE 3. When one or more of the slugs 24 soften sufficiently due to a rise in temperature to respond to the force of the back-up spring 25, such slug will move over the detent 22 and assume the active indicator position shown particularly in FIGURE 4. It should be understood that the entire casing 20 is transparent as are the tubes 21, and therefore the meltable slugs 24 are clearly visible to an observer. In some instances, the slugs 24 may have different colors and this may constitute an informational key to the several melting points of the slugs which establish the indication and recording of a given temperature or temperatures which have been exceeded by a piece of equipment. The casing 20 may have visibly marked upon it in some suitable manner adjacent the several tubes 21 the temperatures which the indicator senses and records.

In any event, the user of the devices in FIGURES 1–5 will be certain that a given piece of machinery or equipment has never reached or exceeded or been exposed to even the lowest of the three temperatures at which the three slugs 24 will melt, as long as the three slugs are in the retracted position indicated particularly in FIGURE 3. On the other hand, when one slug has softened and moved forwardly under influence of its spring as depicted in FIGURES 1 and 2, the observer will know that a first definite temperature, such as a 120° F., has been exceeded by a piece of equipment but the equipment has never been exposed to temperatures exceeding the next indicator temperature such as 160° F. If two of the slugs 24 are observed in the advanced position or indicating position shown in FIGURE 4, it will immediately be apparent that the equipment upon which the invention is placed has been exposed to a temperature in excess of 160° F. but less than 200° F. for the example given herein. Likewise, if all three of the slugs 24 have softened due to a rise in temperature and have moved under influence of the springs 25 to the advanced position, then the observer will know that the equipment or machinery upon which the invention is placed has been exposed to a temperature equaling or exceeding the maximum temperature which the three element indicator is capable of sensing, indicating and recording.

It is believed that the utility of the device shown in FIGURES 1 through 5 will be readily apparent to anyone skilled in the art upon a reading of the foregoing description. While the drawings show the plastic casing or box 20 entirely surrounding or covering the tubes 21, it should be understood that one side wall of the casing parallel to the tubes may be omitted from the assembly if desired, to allow air to circulate directly over the tubes. If desired, the major side walls of the casing 20 may be provided with small openings in their regions between adjacent tubes 21 for this same purpose. These optional features, if employed, will tend to increase slightly the sensitivity and reaction time of the device. However, it is thought that the invention as presently illustrated in FIGURES 1–5 is quite efficient and sensitive, and since the device may be placed in direct contact with the equipment or machinery being monitored, there will be no objectionable lag in the responsiveness of the device to rises in temperature. The wall thickness of the casing 20 and tubes 21 need not be great and the heat from the machinery or other equipment will be readily conducted to the slugs 24 when the device is placed upon or attached to such machinery or equipment.

In FIGURES 6–8 of the drawings, there is shown a modification of the invention, whose purpose, use and mode of operation is essentially the same as the previously-described form of the invention, but differs therefrom in specific construction. In FIGURES 6–8 inclusive, the casing 27 formed of plastic material or the like may be opaque or transparent as found desirable. Indicator plungers 28, rectangular in cross section, are arranged movably in parallel compartments 29 of like shape formed in the casing 27. Corresponding ends of the compartments 29 have reduced openings 30 for the reception of reduced indicator extensions or heads 31 formed upon the plungers 28. As in the prior form of the invention, the plungers 28 are backed up by compressible coil springs 32, whose forces constantly urge the plungers 28 forwardly or toward the openings 30.

The several plungers 28 are held normally in the retracted positions shown in the drawings by meltable slugs 33, in the form of cylindrical pins which in the hardened state engage within registering approximately semi-cylindrical recesses 34 and 35 of the plungers and casing side and divider walls, as shown. While in the hardened or solid state, the meltable elements 33 serve as detents to lock the indicator plungers 28 in their retracted positions or non-indicating positions.

As in the first form of the invention, when a temperature is reached corresponding to the melting point of one of the elements 33, such element will melt or soften as depicted at the left hand side of FIGURE 6, and the associated spring 32 will immediately thrust the adjacent plunger 28 forwardly so that its indicating head 31 is visible outside of the casing 27. This enables the observer to know at a glance that a machine or the like upon which the invention has been placed has been exposed at least to a temperature equal to the melting point of the element 33 having the lowest precise melting point in the particular invention assembly. It is thought that in light of the preceding description of the operation of the first form of the invention, no further description of the operation of the form illustrated in FIGURES 6–8 is required.

The form of the invention in FIGURES 6–8 possesses certain advantages over the first-disclosed form. The separately formed tubes 21 are eliminated and the internal chambers 29 of the casing 27 receive the indicator plungers directly. As mentioned previously, the assembly does not have to be transparent in FIGURES 6 through 8 because of the feature whereby the indicator heads 31 project outside of the casing in the active indicating positions. The embodiments of FIGURES 6–8 are capable of having somewhat more eye appeal than the first form of the invention because the interior parts may be concealed from view. Basically, however, both forms of the invention thus far described can perform the same function with substantially equal efficiency.

In FIGURES 9 through 11, there is shown another modification of the invention, wherein the meltable slugs or detent elements are dispensed with and in their place a temperature-sensitive bimetal element is employed for locking and releasing like indicator plungers. In these figures, the numeral 36 designates a casing generally similar to the casing 27 and formed of opaque or transparent plastic or the like. The casing 36 receives shiftable indicator plungers 37 constructed and arranged much like the previously-described plungers 28 and including forward reduced indicator heads 38 for the purpose already disclosed. The plungers 37 are urged forwardly by springs 39 which may be exactly like the previously-described springs.

The significant difference in the construction of the invention in FIGURES 9–11 resides in the provision in the lower side of each plunger 37 of a detent recess 40 adapted to receive the short lateral extension of a bimetallic detent element 41, anchored by a rivet 42 to the lower wall 43 of casing 36. Each of the three plungers 37 within the casing 36 contains one of the recesses 40 and each plunger has associated with it a bimetal detent element 41 having a specifically different temperature characteristic.

When each bimetal element 41 is in the cold condition, FIGURE 10, it will be deflected inwardly at its free end remote from the rivet 42 to engage within the recess 40 and hold the associated plunger 37 retracted against the force of the spring 39. When the particular bimetal element 41 is heated to or beyond a predetermined precise temperature, FIGURE 11, it will straighten out and remove itself from the recess 40 and allow the spring 39 to thrust the particular plunger 37 forwardly so that the indicator head 38 will be exposed to view.

As clearly shown in FIGURES 10 and 11, the temperature-responsive bimetal detent elements 41 are contained within shallow recesses or a single recess 44 formed in the lower wall 43 of the casing. The heads of the rivets 42 are preferably flush with the wall 43 so that the device may be placed directly upon a machine or the like with the rivets in direct thermal contact with the machine. This tends to increase the sensitivity of the invention because heat is conducted directly by the rivets to the bimetal elements 41. It will of course be understood that the plural indicator units of the invention in FIGURES 9–11 may be calibrated so as to respond separately to the same differences in temperature mentioned in connection with the first form of the invention or to any selected or preferred temperature differentials. Another advantage of the construction in FIGURES 9–11 resides in the fact that the device is readily resettable or reusable after cooling. After cooling, each bimetal element 41 returns automatically to the position indicated in FIGURE 10 and it is a simple matter to return the plungers 37 to their retracted positions whereupon the short lateral extension of each bimetal element will again snap into the adjacent recess 40 and lock the plunger in the retracted position.

FIGURE 12 of the drawing shows a very slight modification of the construction in FIGURES 9–11. In FIGURE 12, all parts and their operation are identical to corresponding parts shown and described in FIGURES 9–11, except that the rivet 42 for each bimetal element 41 is omitted. Instead, each bimetal element 41', FIGURE 12, has an integral hook extension 45 engaging through an opening 46 in the casing 36' for the purpose of anchoring the element 41' without the use of a rivet. Additionally, the integral extension 45 in FIGURE 12 may be arranged in direct thermal contact with the machine or equipment being monitored by the invention. In all other respects, the construction in FIGURE 12 is identical to that of FIGURES 9–11 and need not be described in further detail. The mode of operation of the FIGURE 12 embodiment is identical to that of FIGURES 9–11. In fact, the essential mode of operation of all forms of the invention is basically the same as described for the first form of the invention.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described our invention, we claim:

1. A temperature indicating device comprising a casing including plural internal divider walls forming plural substantially parallel elongated compartments within the casing, corresponding ends of the compartments having openings leading to the exterior of the casing, said openings being of reduced cross section, whereby each compartment has stop shoulders formed at its leading end, an indicator plunger within each compartment of the casing and movable longitudinally therein from a retracted non-indicating position to an extended temperature indicating position, each plunger having a reduced leading extremity projectable through the adjacent opening and shoulders engageable with said compartment stop shoulders to limit forward movement of the plunger, an expansible spring mounted within each compartment behind the plunger therein and bearing upon the rear end of the plunger, and a fusible detent pin for each plunger within the casing having mechanical interlocking engagement therewith prior to fusion of the detent pin and releasably securing each plunger in said retracted non-indicating position, each fusible detent pin upon fusion releasing its plunger for movement to the indicating position, and each detent pin having a specific precise fusion temperature different from the fusion temperatures of the other detent pins of the device, whereby the device may be used to monitor a range of temperatures.

2. The invention as defined by claim 1, and wherein each indicator plunger is provided in one side thereof with a notch receiving one of the detent pins, the adjacent divider wall of the casing having a companion notch receiving the pin so that the pin prior to fusion positively interlocks the plunger with the divider wall.

3. The invention as defined by claim 2, and wherein said compartments and indicator plungers are polygonal in cross section.

4. A temperature indicating device comprising a rectangular casing having plural side-by-side internal compartments and internal divider walls separating the compartments, the compartments having openings leading from corresponding ends thereof and having stop shoulders formed therein adjacent said openings, an indicator plunger mounted within each compartment and being movable longitudinally therein and having an indicator head on its forward end adapted to project through the adjacent opening when the plunger shifts to an indicating position, the indicator heads being retracted into said compartments and openings when the plungers are in non-indicating positions, a stop shoulder on each plunger engageable with the adjacent compartment stop shoulder to positively limit the degree of extension of the indicator head through the opening, a coil spring within each compartment behind the plunger therein and constantly urging the plunger forwardly to the indicating position, and a meltable detent element for each plunger within each compartment to releasably hold each plunger in the retracted non-indicating position and releasing the plunger upon melting so that each plunger may be shifted by its spring to the indicating position, each detent element having a different precise melting temperature, each plunger having a side notch receiving the detent element in interlocking relation when the detent element is in the solid state and holding the plunger retracted.

References Cited by the Examiner

UNITED STATES PATENTS

| | | | |
|---|---|---|---|
| 1,496,194 | 6/1924 | Ziegler | 116—114.5 |
| 1,623,666 | 4/1927 | Ferkel | 73—358 X |
| 2,966,261 | 12/1960 | Bradbury | 73—358 X |
| 3,090,235 | 5/1963 | Houser | 73—358 |
| 3,140,611 | 7/1964 | Kliemer | 73—358 |

LOUIS R. PRINCE, *Primary Examiner.*

DANIEL M. YASICH, *Assistant Examiner.*